(12) United States Patent
Wang

(10) Patent No.: US 10,784,638 B2
(45) Date of Patent: Sep. 22, 2020

(54) ADAPTOR PLUG ASSEMBLY

(71) Applicant: Huang-Liang Wang, Taipei (TW)

(72) Inventor: Huang-Liang Wang, Taipei (TW)

( * ) Notice: Subject to any disclaimer, the term of this patent is extended or adjusted under 35 U.S.C. 154(b) by 0 days.

(21) Appl. No.: 16/417,649

(22) Filed: May 21, 2019

(65) Prior Publication Data
US 2019/0273348 A1    Sep. 5, 2019

Related U.S. Application Data

(63) Continuation-in-part of application No. 15/678,113, filed on Aug. 16, 2017, now abandoned.

(30) Foreign Application Priority Data

Feb. 15, 2017  (TW) .............................. 106202197 U

(51) Int. Cl.
*H01R 31/06* (2006.01)
*H01R 13/66* (2006.01)
*H02J 7/00* (2006.01)
*H02J 7/02* (2016.01)
*H02H 9/02* (2006.01)

(52) U.S. Cl.
CPC ....... *H01R 31/065* (2013.01); *H01R 13/6675* (2013.01); *H01R 13/6683* (2013.01); *H01R 13/6691* (2013.01); *H02J 7/0013* (2013.01); *H01R 13/6666* (2013.01); *H02H 9/02* (2013.01); *H02J 7/02* (2013.01)

(58) Field of Classification Search
CPC ..................................................... G01R 31/04

USPC ........................................................ 324/538
See application file for complete search history.

(56) References Cited

U.S. PATENT DOCUMENTS

| | | | | |
|---|---|---|---|---|
| 2010/0145542 A1* | 6/2010 | Chapel | ................. | G06F 1/3209 700/295 |
| 2011/0082599 A1* | 4/2011 | Shinde | ................. | H02J 13/0003 700/295 |
| 2013/0183043 A1* | 7/2013 | Elberbaum | ............ | G01R 19/00 398/115 |
| 2014/0097691 A1* | 4/2014 | Jackson | ............... | G01R 21/133 307/66 |
| 2015/0066227 A1* | 3/2015 | Chapel | ................ | H04L 12/4633 700/295 |
| 2016/0091196 A1* | 3/2016 | Chien | ................ | F21V 33/0048 362/253 |

* cited by examiner

*Primary Examiner* — Jason C Olson

(57) ABSTRACT

An adaptor plug assembly includes an adaptor plug and a mobile device which has a receiving unit. The adaptor plug includes a housing having a first connection end from which two terminals extends, and a second connection end in which three receptacle holes are defined. The two terminals are connected to the second connection end. A coil is mounted to one of the two terminals and electrically connected to a micro controller which includes a calculating unit, a transforming unit and a wire-less transmitting unit. The transforming unit receives current inducted by the coil and transforms the current into a first signal which is sent to and calculated by the calculating unit to be a second signal which is transmitted by the wire-less transmitting unit to the receiving unit of the mobile device. A power unit is installed in the housing provides power to the micro controller.

6 Claims, 6 Drawing Sheets

US 10,784,638 B2

ADAPTOR PLUG ASSEMBLY

FIELDS OF THE INVENTION

The present invention is a Continuation-In-Part application of applicant's former patent application U.S. patent Ser. No. 15/678,113, filed on Aug. 16, 2017.

BACKGROUND OF THE INVENTION

Descriptions of Related Art

The plugs of electronic devices some include two terminals and some include three terminals. The wall jacks some provide two receptacle holes and some provide three receptacle holes. In order to allow the users from different countries to connect their electronic devices to the wall jacks, the adaptor plug is developed which provides convenience for users to use different types of plugs to plug in the wall jackets to get electric current to their electronic devices or the like. Coils are needed to transfer the electric current between the electronic devices and the jackets. However, the conventional adaptor plugs cannot provide sufficient information about the electrical power connected to the electronic devices. Once the users find out abnormal situation, it is too late to separate the electronic devices from the adapter plugs.

The present invention intends to provide an adaptor plug which allows the users to be acknowledged the current supplied to the electronic devices.

SUMMARY OF THE INVENTION

The present invention relates to an adaptor plug assembly for being connected between an electronic device and a wall socket. The adaptor plug assembly comprises a mobile device having a receiving unit. An adaptor plug includes a housing which includes a first connection end and a second connection end. Two terminals each have a first end thereof extending through the first connection end, and a second end of each of the two terminals is connected to the second connection end. A coil is located in the housing and mounted to one of the two terminals and electrically connected to a micro controller in the housing. The micro controller comprises a calculating unit, a transforming unit, a power unit, a storage capacitor and a switch unit. The calculating unit, the transforming unit, the power unit, the storage capacitor and the switch unit are electrically connected to each other by the micro controller. The transforming unit receives a first signal that is detected by the coil, and sends the first signal to the calculating unit. The calculating unit calculates the first signal and obtains a second signal which is sent to the mobile device by way of wireless transmission. The power unit provides power to the micro controller, such that a user monitors the electrical connection between the wall socket and the electronic device by the mobile device. The switch unit controls the coil to be electrically connected to the transforming unit to form a power supply mode, or the switch unit controls the coil to be electrically connected to the storage capacitor to form a charging mode.

Preferably, the micro controller includes an overload protection unit which checks the inducted current of the coil and depresses voltage to protect the micro controller when an overload current is detected.

Preferably, the power unit is chargeable batteries. When the switch unit is switched to the charging mode and the terminals on the first connection end of the housing are plugged to the wall socket, the power unit is charged. When the power unit is fully charged, the power is stored in the storage capacitor. When the second connection end of the housing is electrically connected to an electronic device, the power unit outputs power to the micro controller.

Preferably, the terminals each are a rod or a plate, the second connection end includes three receptacle holes, the two respective second ends of the two terminals are connected to two of the three receptacle holes, the other one of the three receptacle holes has an earth terminal located therein.

Preferably, the transmitting method for transmitting the second signal to the mobile device by the micro controller is made by way of low-power Bluetooth transmission, cloud-transmission or ultra-red transmission.

The primary object of the present invention is to provide an adaptor plug assembly which allows the user to check the electrical connection between the electronic device and the wall socket by using a mobile device so as to avoid overload or any abnormal situation.

The present invention will become more apparent from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
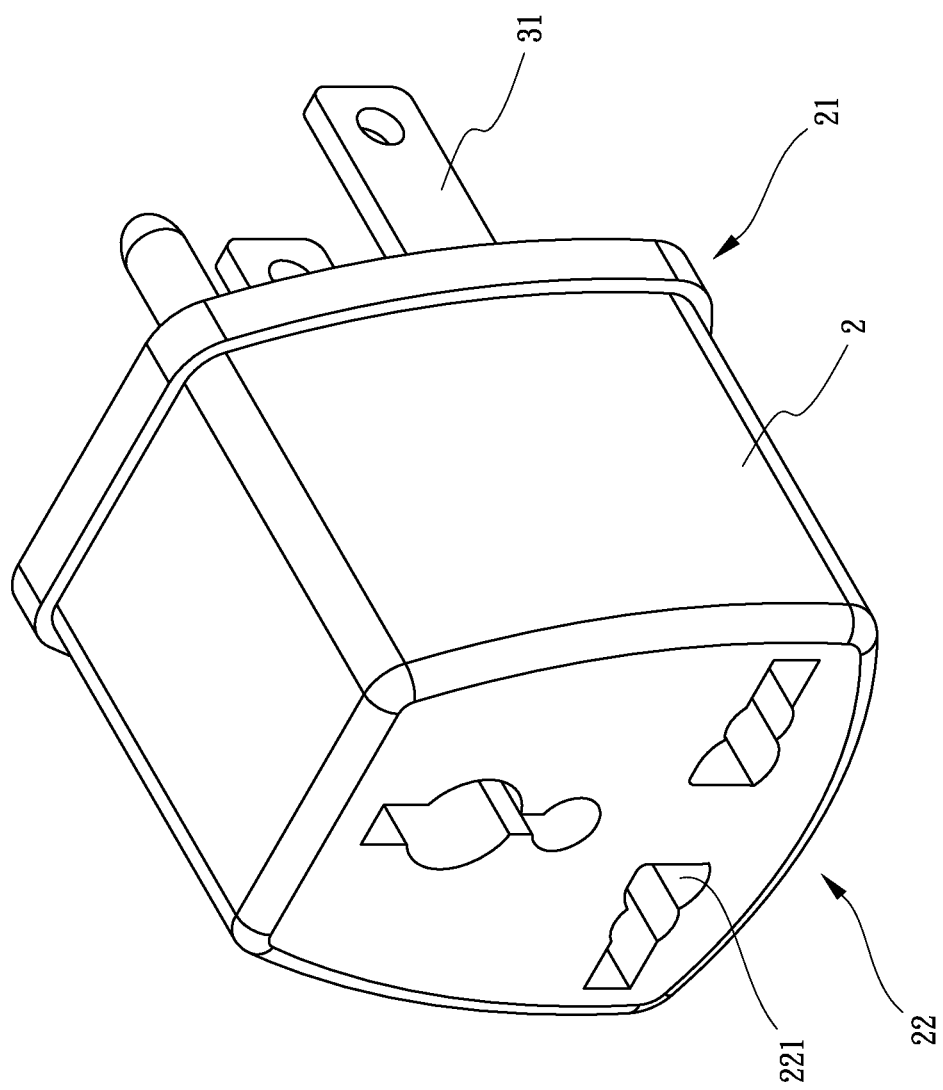
FIG. 1 is a perspective view to show the adaptor plug of the present invention.
Figure 2:
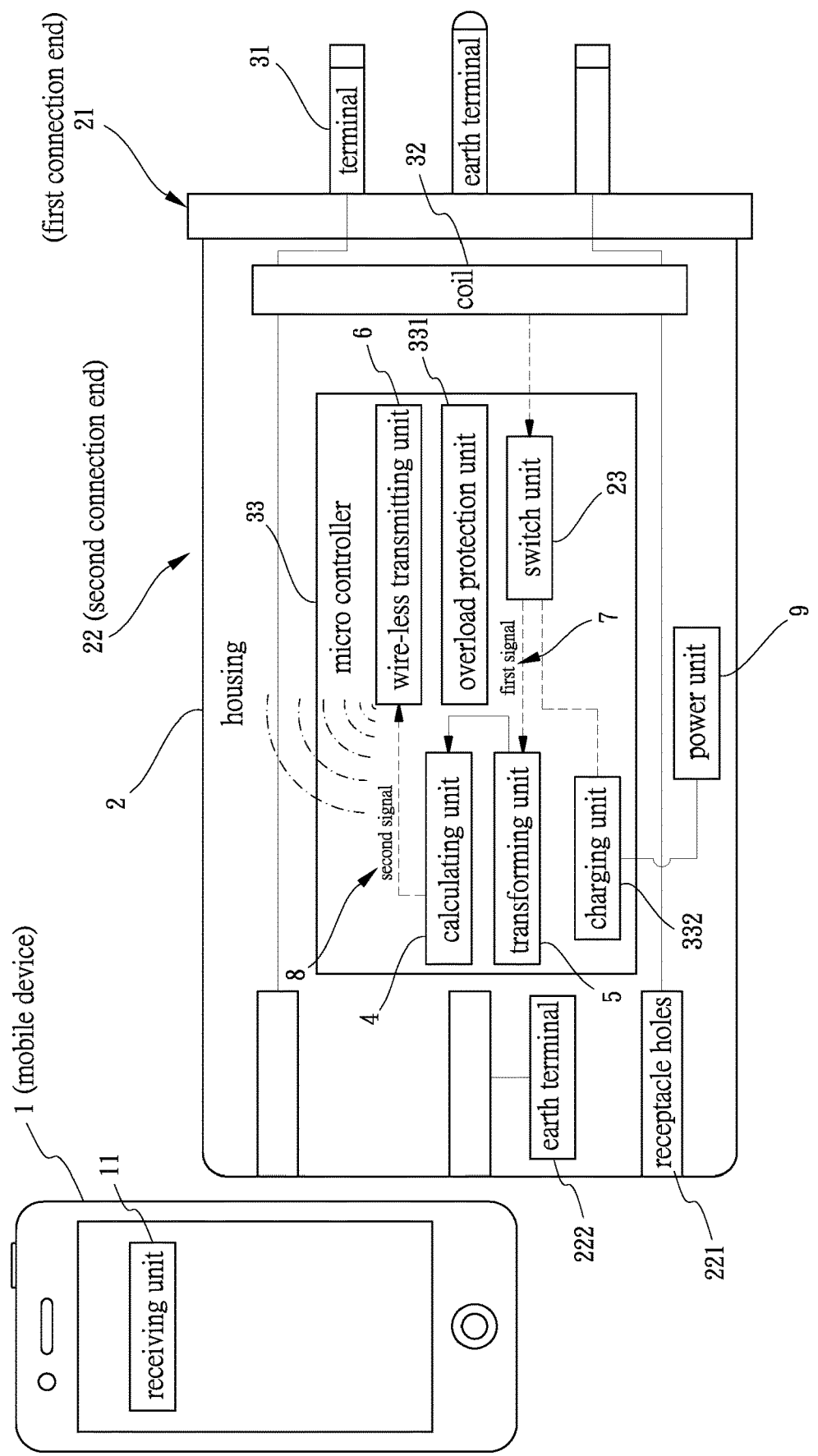
FIG. 2 shows the composition of the adaptor plug of the present invention.
Figure 2A:
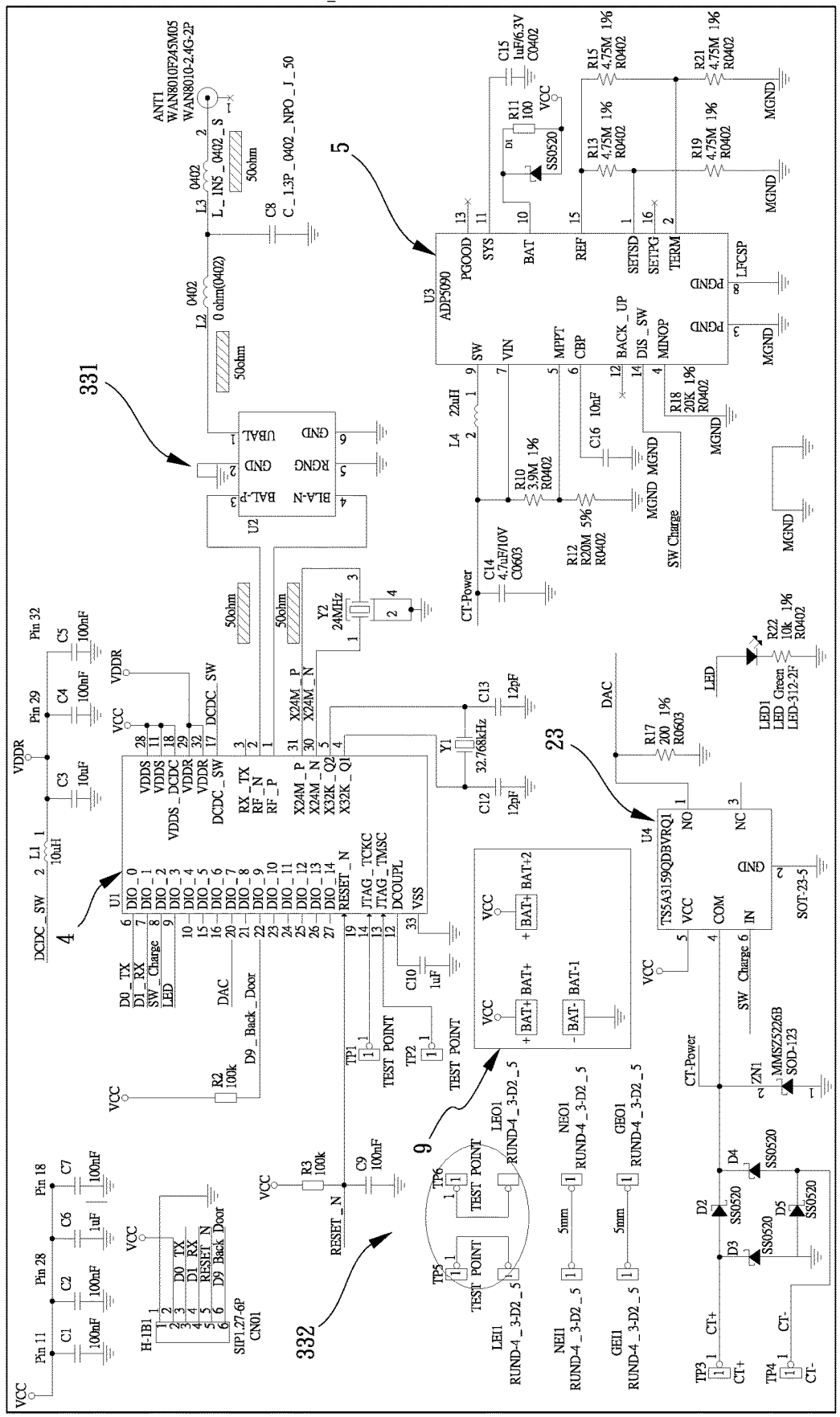
FIG. 2A shows the circuits of the circuits of the calculating unit, the transforming unit, the power unit, the storage capacitor, and the switch unit installed on the micro controller.
Figure 3:
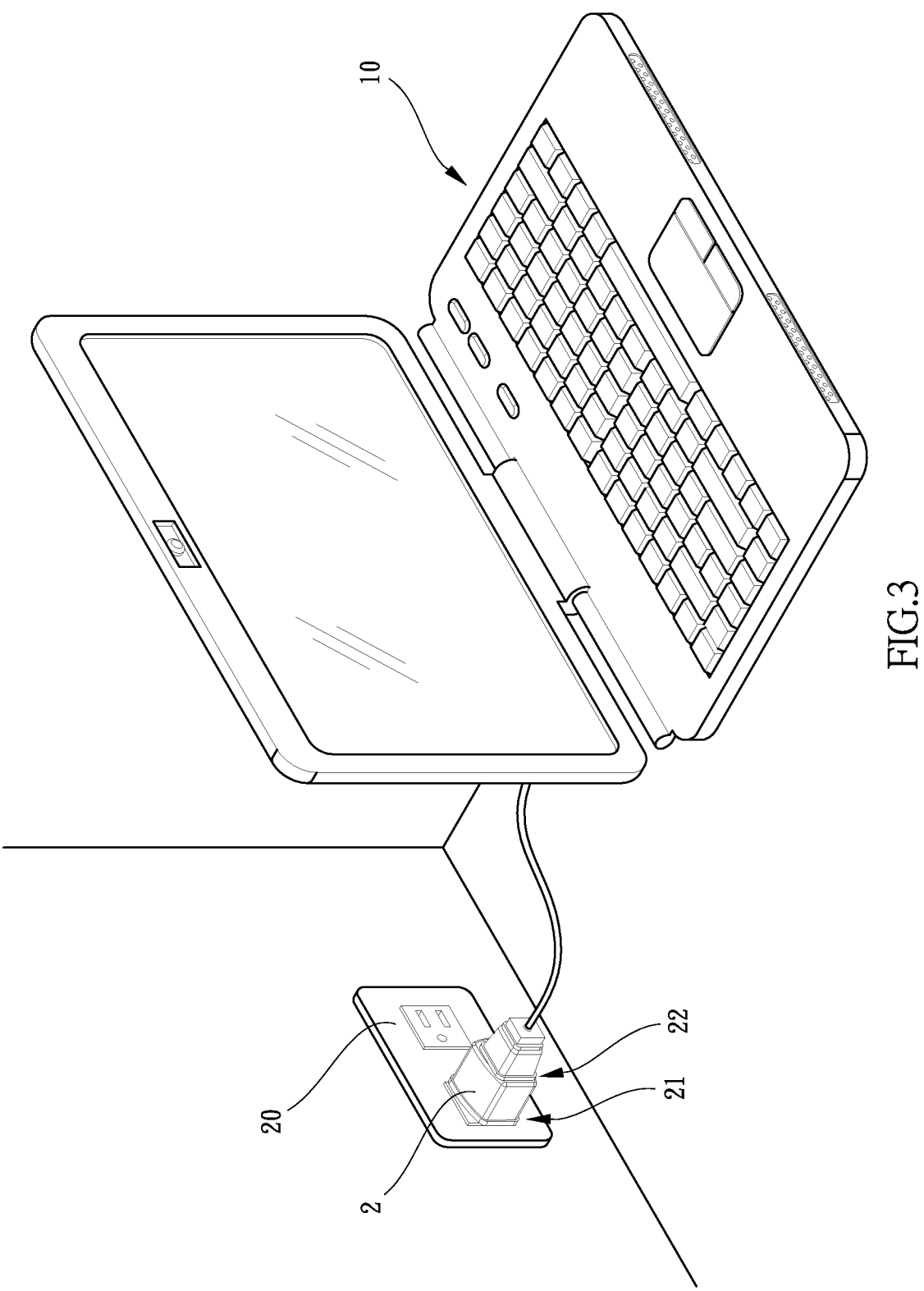
FIG. 3 shows that the adaptor plug of the present invention is electrically connected between the wall socket and an electronic device.

Referring to FIGS. 1, 2, 2A, 3, 4 and 5, the adaptor plug assembly of the present invention for being connected between an electronic device 10 and a wall socket 20. Especially, when the wall socket 20 provides only two holes for receiving the terminals, while the electronic device 10 has three terminals, the adaptor plug assembly of the present invention provides an ideal solution. The adaptor plug assembly of the present invention comprises an adaptor plug and a mobile device 1 which has a receiving unit 11. The adaptor plug comprises a housing 2 which includes a first connection end 21 and a second connection end 22. Two terminals 31 each have the first end thereof extending through the first connection end 21, and the second end of each of the two terminals 31 is connected to the second connection end 22. The terminals 31 each are a rod or a plate. The second connection end 22 includes three receptacle holes 221. The two respective second ends of the two terminals 31 are connected to two of the three receptacle holes 221, and the other one of the three receptacle holes 221 has an earth terminal 222 located therein. It is noted that the adaptor plug of the present invention may include two or three terminals 31 on the first connection end 21, similarly, two or three receptacle holes 221 can be set to the second connection end 22 of the adaptor plug of the present invention so as to meet requirements of different situations.

A coil 32 is located in the housing 2 and mounted to one of the two terminals 31 and electrically connected to a micro controller 33 that is located in the housing 2. The micro controller 33 comprises a calculating unit 4, a transforming unit 5, a wire-less transmitting unit 6, a power unit 9, a storage capacitor 332 and a switch unit 23. The calculating unit 4, the transforming unit 5, the wire-less transmitting unit 6, the power unit 9, the storage capacitor 332 and the switch unit 23 are electrically connected to each other by the micro controller 33. The transforming unit 5 receives a first signal 7 that is detected by the coil 32, and sends the first signal 7 to the calculating unit 4. The calculating unit 4 calculates the first signal 7 and obtains a second signal 8 which is sent to the mobile device 1 by way of wireless transmission. The power unit 9 provides power to the micro controller 33. The switch unit 23 controls the coil 32 to be electrically connected to the transforming unit 5 to form a power supply mode, or the switch unit 23 controls the coil 32 to be electrically connected to the storage capacitor 332 to form a charging mode. The micro controller 33 switches the two different molds via the switch unit 23. The storage capacitor 332 is electrically connected to the power unit 9 and the coil 32. When the coil 32 generates electro-magnetic induction to have saturated power, the storage capacitor 332 stores extra electric power. The stored electric power can be used to charge the power unit 9.

A user monitors the electrical connection between the wall socket 20 and the electronic device 10 by the mobile device 1. When the power is low, the user can operate the switch unit 23 to provide power to the micro controller 33. When there is no electronic device 10 connected to the second connection end of the adaptor plug of the present invention, and the adaptor plug of the present invention is plugged to the wall socket 20, the power is stored in the storage capacitor 332. The power stored in the storage capacitor 332 can be used to power the electronic device 10 when the electronic device 10 is connected to the second connection end 22 of the adaptor plug of the present invention.

It is noted that the adaptor plug of the present invention may include two or three terminals 31 on the first connection end 21, similarly, two or three receptacle holes 221 can be set to the second connection end 22 of the adaptor plug of the present invention so as to meet requirements of different situations.

When the plug of the electronic device 10 includes three terminals wherein one of the three terminals is the earth terminal, while the wall socket 20 only provides two holes for receiving the terminals. The adaptor plug of the present invention is used. The three terminals of the plug of the electronic device 10 are plugged into the second connection end 22 of the housing 2 of the adaptor plug, and the terminals 31 on the first connection end 21 of the housing 2 of the adaptor plug are plugged to the wall socket 20. Preferably, the micro controller 33 includes an overload protection unit 331 which checks the inducted current of the coil 32 and depresses voltage to protect the micro controller 33 when the overload current is detected. When the city power is not stable, the overload protection unit 331 of the micro controller 33 constantly checks the inducted current made by the coil 32 and depresses the voltage to protect the micro controller 33 when the overload current is detected.

Figure 4:
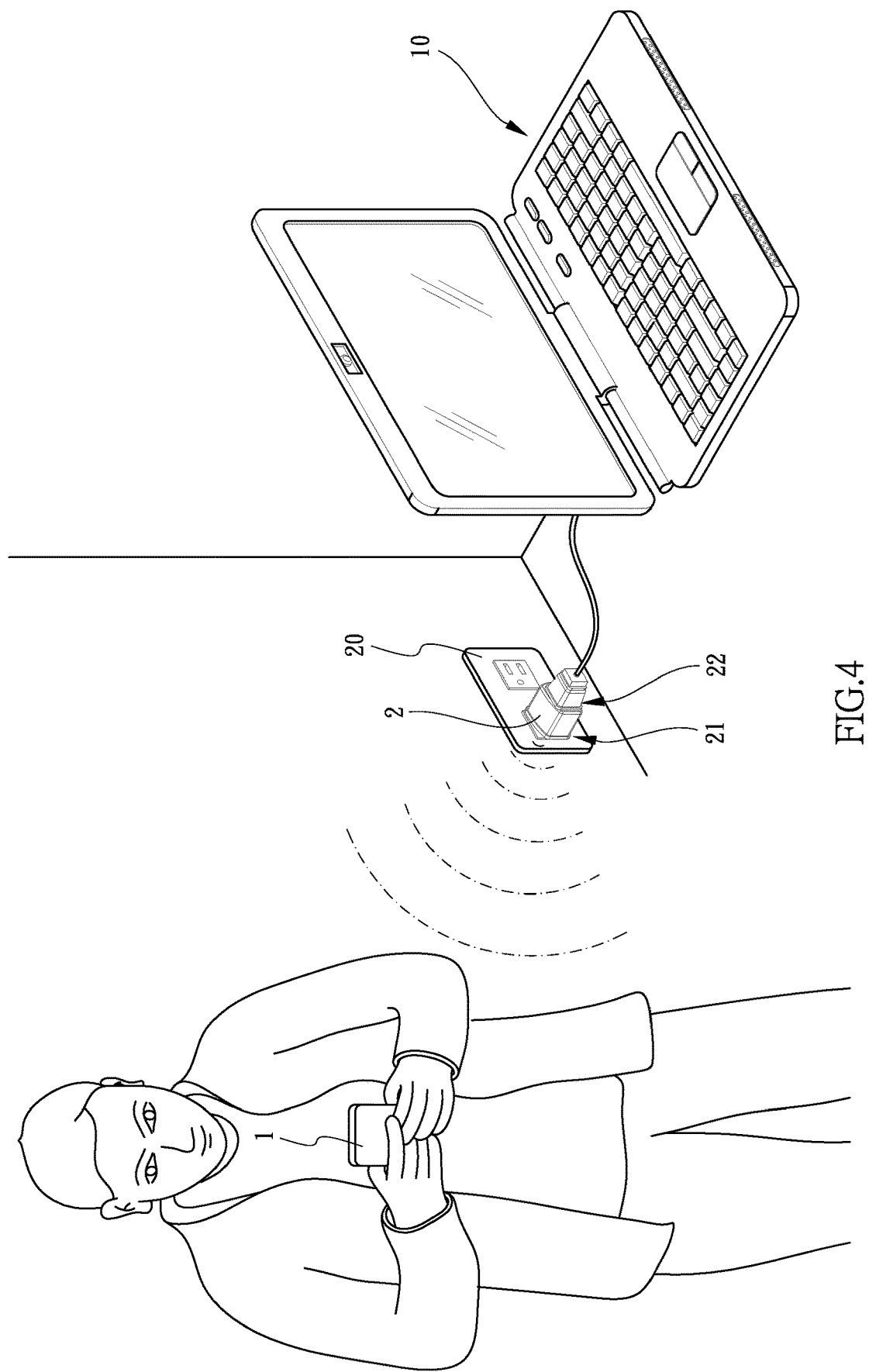
FIG. 4 shows the wire-less transmission between the adaptor plug assembly of the present invention and the mobile device.
Figure 5:
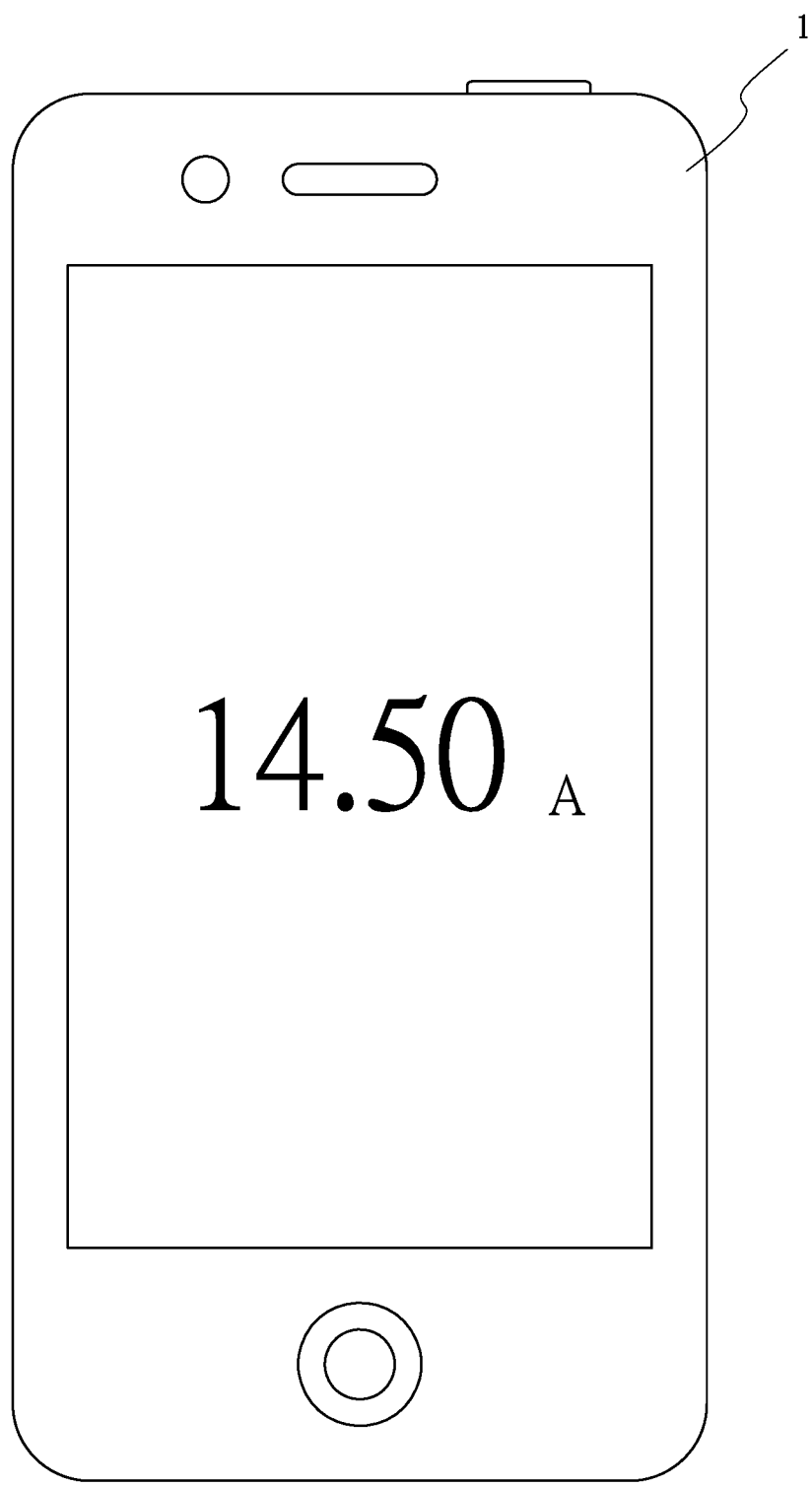
FIG. 5 shows the mobile device displays the second signal.

The user is acknowledged the status by using the receiving unit 11 of the mobile device 1 to receive the latest information from the wire-less transmitting unit 6 of the micro controller 33 as shown in FIGS. 4 and 5. It is noted that the power unit 9 can be other type of batteries such as self-generating batteries.

By providing the latest status of the electrical connection between the electronic device 10 and the wall socket 20 to the mobile device 1 of the user, the user can monitor and avoid potential risks to the electronic device 10.

Preferably, the transmitting method between the wire-less transmitting unit 6 of the micro controller 33 and the receiving unit 11 of the mobile device 1 is made by way of low-power BLUETOOTH transmission (BLE), cloud-transmission or ultra-red transmission. The user can receive information of the electric connection between the electronic device 10 and the wall socket 20 by the adaptor plug of the present invention from the mobile device 1 so as to respond situations of the connection in time.

While we have shown and described the embodiment in accordance with the present invention, it should be clear to those skilled in the art that further embodiments may be made without departing from the scope of the present invention.

What is claimed is:

1. An adaptor plug assembly for being connected between an electronic device and a wall socket, and comprising:
a mobile device having a receiving unit;
an adaptor plug having a housing which includes a first connection end and a second connection end;
two terminals each having a first end thereof extending through the first connection end, a second end of each of the two terminals connected to the second connection end, a coil located in the housing and mounted to one of the two terminals and electrically connected to a micro controller in the housing, the micro controller comprising a calculating unit, a transforming unit, a power unit, a storage capacitor and a switch unit, the calculating unit, the transforming unit, the power unit, the storage capacitor and the switch unit being electrically connected to each other by the micro controller, the transforming unit configured to receive a first signal that is detected by the coil, and the transforming unit configured to send the first signal to the calculating unit, the calculating unit configured to calculate the first signal and obtain a second signal which is sent to the mobile device by way of wireless transmission, the power unit configured to provide power to the micro controller, such that a user monitors electrical connection between the wall socket and the electronic device by the mobile device, the switch unit controlling the coil to be electrically connected to the transforming unit to form a power supply mode, or the switch unit controlling the coil to be electrically connected to the storage capacitor to form a charging mode.

2. The adaptor plug assembly as claimed in claim 1, wherein the micro controller includes an overload protection unit configured to check an inducted current of the coil and depress voltage to protect the micro controller when an overload current is detected.

3. The adaptor plug assembly as claimed in claim 1, wherein the power unit is chargeable batteries, when the switch unit is switched to the charging mode and the terminals on the first connection end of the housing are plugged to the wall socket, the power unit is charged, when the power unit is fully charged, the power is stored in the storage capacitor, when the second connection end of the housing is electrically connected to an electronic device, the power unit outputs power to the micro controller.

4. The adaptor plug assembly as claimed in claim 2, wherein the power unit is chargeable batteries, when the switch unit is switched to the charging mode and the 5 terminals on the first connection end of the housing are plugged to the wall socket, the power unit is charged, when the power unit is fully charged, the power is stored in the storage capacitor, when the second connection end of the housing is electrically connected to an electronic device, the power unit outputs power to the micro controller.

5. The adaptor plug assembly as claimed in claim 1, wherein the terminals each are a rod or a plate, the second connection end includes three receptacle holes, the two respective second ends of the two terminals are connected to two of the three receptacle holes, the other one of the three receptacle holes has an earth terminal located therein.

6. The adaptor plug assembly as claimed in claim 5, wherein a transmitting method for transmitting the second signal to the mobile device by the micro controller is made by way of low-power BLUETOOTH transmission, cloud-transmission or ultra-red transmission.

\* \* \* \* \*